United States Patent [19]

Schmitt

[11] 3,904,613
[45] Sept. 9, 1975

[54] HEMICYANINE DYESTUFFS

[75] Inventor: Ernst Schmitt, Cologne, Germany

[73] Assignee: Bayer Aktiengesellschaft, Leverkusen-Bayerwerk, Germany

[22] Filed: Dec. 9, 1971

[21] Appl. No.: 206,522

[30] Foreign Application Priority Data

Dec. 9, 1970 Germany............................ 2060615

[52] U.S. Cl........ 260/240.8; 260/240 E; 260/240.6; 260/240.65; 260/240.9; 260/307 F; 260/326.11; 8/12; 8/54.2; 8/177 R; 8/178 R; 8/179

[51] Int. Cl............................................. C07d 27/56

[58] Field of Search...................... 260/240.8, 240 E

[56] References Cited
UNITED STATES PATENTS

| | | | |
|---|---|---|---|
| 2,077,063 | 4/1937 | Wolff.................... | 260/240 E |
| 2,155,459 | 4/1939 | Winter et al.......... | 260/240.8 |
| 2,289,303 | 7/1942 | Dieterle et al....... | 260/240 E |
| 2,906,588 | 9/1959 | Brunkhorst et al.. | 260/240.8 |
| 3,013,015 | 12/1961 | Plue..................... | 260/240 E |
| 3,113,825 | 12/1963 | Streck.................. | 260/240 E |
| 3,401,404 | 9/1968 | Seidel et al.......... | 260/240 E |

*Primary Examiner*—Henry R. Jiles
*Assistant Examiner*—S. D. Winters
*Attorney, Agent, or Firm*—Plumley & Tyner

[57] ABSTRACT

Dihydroindoles of the formula

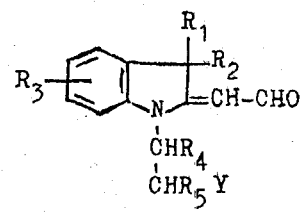

and their use as condensation components for the manufacture of basic indolenine dyestuffs of the formula

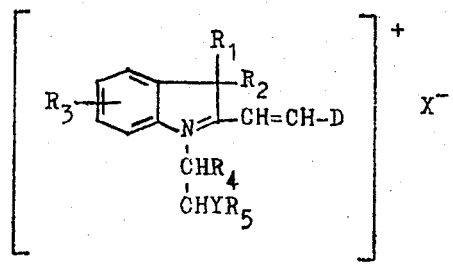

The dyestuffs are used for dyeing and printing natural and synthetic materials.

5 Claims, No Drawings

HEMICYANINE DYESTUFFS

The subject of this invention are dyestuffs of the formula

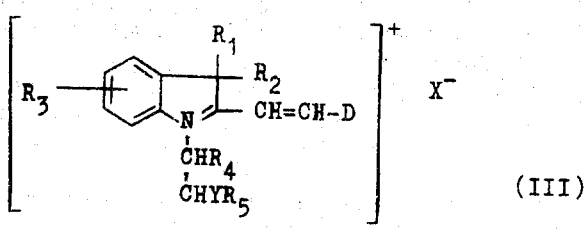

wherein
- $R_1$ represents a lower alkyl radical and
- $R_2$ represents a lower alkyl radical and the radicals $R_1$ and $R_2$ together with the shared C atom of the indolenine ring can form a saturated 5-membered or 6-membered ring,
- $R_3$ represents hydrogen, one or more non-ionic substituents or the remaining part of a fused, optionally non-ionically substituted, 5-membered or 6-membered ring or represents carboxyl,
- $R_4$ represents hydrogen or a non-ionic substituent,
- $R_5$ represents hydrogen or a non-ionic substituent,
- Y represents halogen,
- $X^-$ represents an anion and
- D represents the radical

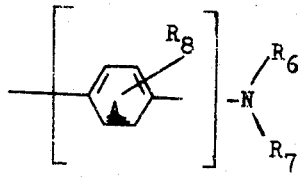

wherein
- $R_6$ denotes lower alkyl or an aromatic structure which can be linked to the ring A either directly or via O, S, NH or N-alkyl,
- $R_7$ denotes hydrogen, aralkyl, alkyl or cycloalkyl and wherein alkyl or cycloalkyl radicals $R_7$ can form a 5-membered or 6-membered ring with $R_6$ or with the ring A, optionally via O, S, NH or N-alkyl, and
- $R_8$ denotes one or more non-ionic substituents, or
- D represents the radical

wherein
- $R_9$ denotes aryl and
- $R_{10}$ denotes hydrogen, alkyl or cycloalkyl and wherein alkyl and cycloalkyl radicals $R_{10}$ can form a 5-membered or 6-membered ring with $R_9$, optionally via O, S, NH, N-alkyl or a single bond, or
- D represents the radical

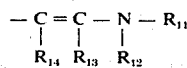

wherein
- $R_{11}$ denotes aryl,
- $R_{12}$ denotes hydrogen or alkyl and either
- $R_{13}$ denotes alkylene linked to $R_{11}$ and
- $R_{14}$ denotes hydrogen or
- $R_{13}$ denotes hydrogen, aryl, alkyl or aralkyl and
- $R_{14}$ denotes a single bond to the aryl radical.

A further subject of the invention are mixtures of dyestuffs of the formula III.

The invention also relates to the use of dyestuffs of the formula III for dyeing and printing natural and synthetic materials.

Non-ionic substituents are, for example, alkyl radicals which, according to the invention, can be cyclic or acyclic, branched or straight-chain, substituted or unsubstituted, such as methyl, ethyl, n-propyl, iso-propyl, n-butyl, isobutyl, tert.-butyl, cyclohexyl and higher alkyl radicals, such as $n$-$C_9H_{19}$ and their substitution products, such as chloromethyl, methoxymethyl, ethoxymethyl, n-propoxymethyl, n-butoxymethyl, n-hexyloxymethyl, n-octyloxymethyl, n-nonyloxymethyl, n-dodecyloxymethyl, aryloxymethyl, such as phenoxymethyl, p-nitrophenoxymethyl, p-methoxyphenoxymethyl and p-chlorophenoxymethyl, $\beta$-chloroethyl, $\beta$-methoxyethyl, fluorine, chlorine, $\beta$-cyanoethyl and also trifluoromethyl, aryl radicals, especially those of the benzene series, such as phenyl, 2-methylphenyl, 3-methylphenyl, 4-methylphenyl, 2,4-dimethylphenyl, 2-chlorophenyl, 4-chlorophenyl, 2-methyl-4-chlorophenyl, 4-cyanophenyl, 4-nitrophenyl, 4-methoxyphenyl and 4-methylsulphophenyl, aralkyl radicals, especially benzyl and its homologues and their substitution products, such as 4-methylbenzyl, 4-chlorobenzyl, 4-nitrobenzyl, 4-methoxybenzyl and 2-phenylethyl, alkoxy radicals, such as methoxy, ethoxy, n-propoxy and n-butoxy, sulphamoyl radicals, nitrile groups, carboalkoxy radicals, such as carbomethoxy and carboethoxy, and carboaryloxy radicals, such as carbophenoxy and 4-methylcarbophenoxy, as well as alkenoxymethyl, such as allyloxymethyl, and alkinoxymethyl, such as propargyloxymethyl.

Lower alkyl radicals are those with 1 – 4 carbon atoms, such as methyl, ethyl, n-propyl, iso-propyl, n-butyl, isobutyl, tert.-butyl and their substitution products, such as chloromethyl, trifluoromethyl, $\beta$-chloroethyl, $\beta$-methoxyethyl, $\beta$-cyanoethyl and $\beta$-dimethylaminoethyl.

Suitable lower alkenyl radicals are, for example, propen-(2)-yl-1, buten-(3)-yl-2 and 2-methylene-propyl-1.

Aralkyl radicals according to the invention are, for example, benzyl, $\beta$-phenylethyl, $\gamma$-phenylpropyl-(2,2)-4-methylbenzyl, 4-chlorobenzyl and 4-nitrobenzyl.

Possible anionic radicals $A^-$ are the organic and inorganic anions which are customary for basic dyestuffs, and as examples there should be mentioned: chloride, bromide, iodide, carbonate, bicarbonate, $CH_3SO_4^-$, $C_2H_5SO_4^-$, p-toluenesulphonate, $HSO_4^-$, $SO_4^{--}$, disulphate, aminosulphate, methanesulphonate, benzenesulphonate, p-chlorobenzenesulphonate, phosphomolybdate, phosphotungstate, acetate, benzoate, chloroacetate, formate, propionate, lactate, crotonate, $NO_3^-$, perchlorate, $ZnCl_3^-$, the anions of saturated or unsaturated aliphatic dicarboxylic acids, such as malonic acid, maleic acid, tartaric acid, citric acid, oxalic acid, itaconic acid, succinic acid, glutaric acid, adipic acid, pimelic acid and suberic acid, and alkanesulphonic acid radicals, such as ndodecylsulphonic acid, tetrapropylenesulphonic acids, $C_{12}$-$C_{20}$-alkanesulphonic acid mixtures and ligninsulphonic acids.

Colourless anions are preferred; for dyeing from an aqueous medium, those anions are preferred which do not excessively impair the solubility of the dyestuff in water.

For dyeing from organic solvents, those anions are also frequently preferred which promote the solubility of the dyestuff in organic solvents or at least do not affect it adversely, such as anions of monobasic organic acids with 4 – 30 carbon atoms.

Dyestuffs of the formula III are manufactured by condensing compounds of the formula

with compounds of the formula

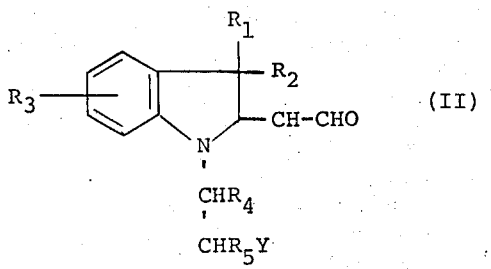

in the presence of acid condensation agents. In the above formulae II and VIII, D, R, $R_2$, $R_3$, $R_4$, $R_5$ and Y have the same meaning as given above in formula III.

Within the framework of the compounds of the formula II, those of the formula IV are particularly preferred:

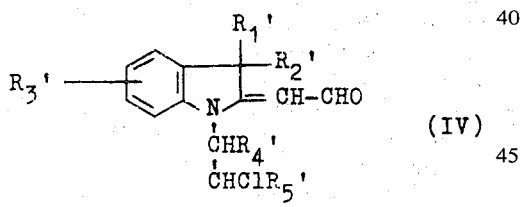

wherein
$R_1'$ represents methyl, ethyl, or n-propyl,
$R_2'$ represents methyl, ethyl or n-propyl,
$R_3'$ represents hydrogen, one or more identical or different radicals methyl, ethyl, n-propyl, tert.butyl, n-hexyl, n-dodecyl, cyclohexyl, fluorine, chlorine, phenyl, 4-nitrophenyl, 4-methoxyphenyl, benzyl, trifluoromethyl, nitrile, carboxy, methylmercapto, ethylmercapto, methylsulphonyl, acetamino, methoxy, ethoxy, n-propoxy, n-butoxy, phenoxy, carbomethoxy, carboethoxy, carbophenoxy or sulphamoyl, and
$R_4'$ and $R_5'$ independently of one another represent hydrogen, methyl, ethyl, n-propyl, n-butyl, n-pentyl, n-hexyl, n-nonyl, carbophenoxy, methoxymethyl, ethoxymethyl, n-propoxymethyl, n-butoxymethyl, n-hexyloxymethyl, n-octyloxymethyl, n-nonyloxymethyl, n-decyloxymethyl, n-dodecyloxymethyl, phenoxymethyl, p-nitrophenoxymethyl, p-methoxyphenoxymethyl, p-chlorophenoxymethyl, phenyl, 4-methoxyphenyl, allyloxymethyl and chlorine or nitrile.

Particularly preferred compounds II and IV are those wherein
$R_4$ and $R_5$ or $R_4'$ and $R_5'$ represent hydrogen, or one of the radicals $R_4$ and $R_5$ or $R_4'$ and $R_5'$ represents hydrogen and the other represents a methyl radical, a chloromethyl radical, a phenyl radical, a phenoxymethyl radical, a methoxymethyl radical, an allyloxymethyl radical or an n-hexoxymethyl radical.

Because they are particularly conveniently accessible, those compounds of the formulae II and IV are particularly preferred
wherein
the radicals $R_4$ and $R_5$ or $R_4'$ and $R_5'$ represent hydrogen, or
one of the radicals $R_4$ and $R_5$ or $R_4'$ and $R_5'$ represents hydrogen and the other represents methyl.

For economic reasons, those compounds of the formulae II and IV are of outstanding importance,
wherein
$R_4$ and $R_5$ or $R_4'$ and $R_5'$ represent hydrogen.

Compounds of the formula II can be manufactured by reaction of 9a-methyl-2,3,9,9a-tetrahydro-oxazolo-[3,2a]-indoles of the formula

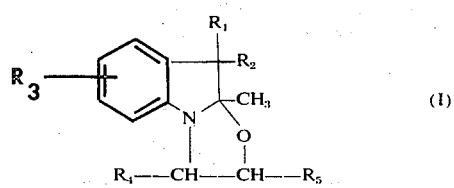

wherein
$R_1$ represents a lower alkyl radical and
$R_2$ represents a lower alkyl radical and the radicals $R_1$ and $R_2$ can form a saturated 5-membered or 6-membered ring with the shared C atom of the 2,3-dihydroindole ring,
$R_3$ represents hydrogen, one or more non-ionic substituents or the remaining part of a fused, optionally non-ionically substituted 5-membered or 6-membered ring or represents carboxyl,
$R_4$ represents hydrogen or a non-ionic substituent and
$R_5$ denotes hydrogen or a non-ionic substituent, with formamides of the formula

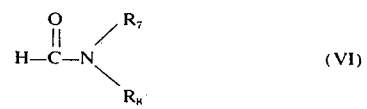

wherein
$R_7$ represents hydrogen or an alkyl radical and
$R_8$ represents an alkyl, aralkyl or aryl radical, in the presence of acid halides.

Compounds of the formula IV and of the groups which have been singled out can be manufactured in the same manner.

When using mixtures of 9a-methyl-2,3,9,9a-tetrahydrooxazolo-[3,2a]-indoles which can arise in the preparation of unsymmetrical oxiranes, mixtures of compounds of the formula II are produced.

Within the framework of the formamides to be used according to the invention, those are preferred wherein $R_7$ represents alkyl radicals with 1 – 5 carbon atoms and $R_8$ represents alkyl radicals with 1 – 5 carbon atoms and radicals of the benzene series, such as phenyl, 2-methylphenyl, 4-methylphenyl, 2,4-dimethylphenyl, 2-chlorophenyl, 4-chlorophenyl, 2-methyl-4-chlorophenyl and 4-nitrophenyl.

The reaction can be carried out in a diluent. Possible diluents of this nature are, especially, acetonitrile, propionitrile, benzonitrile, nitromethane, 2-nitropropane and chlorobenzene. Within the range of the diluents, acetonitrile is particularly preferred.

The reaction of 9a-methyl-2,3,9,9a-tetrahydro-oxazolo[3,2a]-indoles to give 1-(2'-halogenalkyl)-2-(formylmethylene)-3,3-dimethyl-2,3-dihydroindoles can be carried out by introducing the compounds of the formula II into reaction mixtures of acid halides and a formamide, for example dissolved in acetonitrile. The reaction can also be carried out in an excess of formamide, without further diluent.

Acid halides which are suitable according to the invention are, for example, phosphorus oxychloride, phosphorus pentachloride, phosphorus oxybromide, phosgene, thionyl chloride and benzoyl chloride. Acid chlorides, especially phosphorus oxychloride and phosgene, are preferred.

The reaction temperature is between 30° and 120°C, preferably between 35° and 65°C. The reaction is frequently already complete after 2 hours. At times it can, however, be necessary to extend the reaction time to 25 hours.

Formamides which are suitable according to the invention are, for example: N-methylformamide, N-ethylformamide, N-n-propylformamide, N-iso-butylformamide, N,N-dimethylformamide, N-methyl-N-ethylformamide, N-diethylformamide, N-methyl-n-propylformamide and N-phenyl-N-methylformamide. N,N-Dimethylformamide is preferred.

As 9a-methyl-2,3,9,9a-tetrahydro-oxazolo-[3,2a]-indole starting materials, the following can in particular be used: 9,9,9a-trimethyl-2,3,9,9a-tetrahydro-oxazolo-[3,2a]-indole, 7,9,9,9a-tetramethyl-2,3,9,9a-tetrahydro-oxazolo-[3,2a]-indole, 7-chloro-9,9,9a-trimethyl-2,3,9,9a-tetrahydro-oxazolo-[3,2a]-indole, 7-methoxy-9,9,9a-trimethyl-2,3,9,9a-tetrahydro-oxazolo-[3,2a]-indole, 7-ethyl-9,9,9a-trimethyl-2,3,9,9a-tetrahydro-oxazolo-[3,2a]-indole, 7-cyclohexyl-9,9,9a-trimethyl-2,3,9,9a-tetrahydro-oxazolo-[3,2a]-indole, 7-trifluoromethyl-9,9,9a-trimethyl-2,3,9,9a-tetrahydro-oxazolo-[3,2a]-indole, 7-acetamino-9,9,9a-trimethyl-2,3,9,9a-tetrahydro-oxazolo-[3,2a]-indole, 7-cyclohexyl-5,9,9,9a-tetramethyl-2,3,9,9a-tetrahydro-oxazolo-[3,2a]-indole, 9,9-diethyl-9a-methyl-2,3,9,9a-tetrahydro-oxazolo-[3,2a]-indole, 9,9-diethyl-7,9a-dimethyl-2,3,9,9a-tetrahydro-oxazolo-[3,2a]-indole, 9,9-diethyl-7-chloro-9a-methyl-2,3,9,9a-tetrahydro-oxazolo-[3,2a]-indole, 2,9,9,9a-tetramethyl-2,3,9,9a-tetrahydro-oxazolo-[3,2a]-indole, 3,9,9,9a-tetramethyl-2,3,9,9a-tetrahydro-oxazolo-[3,2a]-indole, 9,9,9a-trimethyl-2-phenoxy-2,3,9,9a-tetrahydro-oxazolo-[3,2a]-indole, 9,9,9a-trimethyl-2-phenoxymethylene-2,3,9,9a-tetrahydro-oxazolo-[3,2a]-indole, 9,9,9a-trimethyl-7-methoxy-2-phenoxymethyl-2,3,9,9a-tetrahydro-oxazolo-[3,2 a]-indole, 9,9-diethyl-9a-methyl-2-phenoxymethyl-2,3,9,9a-tetrahydro-oxazolo-3,2a]-indole, 9,9,9a-trimethyl-2-chloromethyl-2,3,9,9a-tetrahydro-oxazolo-[3,2a]-indole, 6-chloro-9,9,9a-trimethyl-2,3,9,9a-tetrahydro-oxazolo-[3,2a]-indole, 5-chloro-9,9,9a-trimethyl-2,3,9,9a-tetrahydro-oxazolo-[3,2a]-indole, 7-fluoro-9,9,9a-trimethyl-2,3,9,9a-tetrahydro-oxazolo-[3,2a]-indole, 7-chloro-6-fluoro-9,9,9a-trimethyl-2,3,9,9a-tetrahydro-oxazolo-[3,2a]-indole, 7-chloro-2-phenoxymethyl-9,9,9a-trimethyl-2,3,9,9a-tetrahydro-oxazolo-[3,2a]-indole, 7,9,9,9a-tetramethyl-2-phenoxymethyl-2,3,9,9a-tetrahydro-oxazolo-[3,2a]-indole, 7-carboxy-9,9,9a-trimethyl-2,3,9,9a-tetrahydro-oxazolo-[3,2a]-indole, 7-carboxy-2-phenoxymethyl-9,9,9a-trimethyl-2,3,9,9a-tetrahydro-oxazolo-[3,2a]-indole, 7-carboxy-3-phenoxymethyl-9,9,9a-trimethyl-2,3,9,9a-tetrahydro-oxazolo-[3,2a]-indole, 7-ethoxy-9,9,9a-trimethyl-2,3,9,9a-tetrahydro-oxazolo-[3,2a]-indole, 9,9,9a-trimethyl-2-ethoxymethyl-2,3,9,9a-tetrahydro-oxazolo-[3,2a]-indole, 9,9,9a-trimethyl-2-(n-propoxymethyl)-2,3,9,9a-tetrahydro-oxazolo-[3,2a]-indole, 9,9,9a-trimethyl-2-(n-hexyloxymethyl)-2,3,9,9a-tetrahydro-oxazolo-[3,2a]-indole, 9,9,9a-trimethyl-2-methoxymethyl-2,3,9,9a-tetrahydro-oxazolo-[3,2a]-indole, 9,9,9a-trimethyl-3-methoxymethyl-2,3,9,9a-tetrahydro-oxazolo-[3,2a]-indole, 7,9,9,9a-tetramethyl-2-phenoxymethyl-2,3,9,9a-tetrahydro-oxazolo-[3,2a]-indole, 7-fluoro-9,9,9a-trimethyl-2-phenoxymethyl-2,3,9,9a-tetrahydro-oxazolo-[3,2a]-indole, 7-chloro-9,9,9a-trimethyl-2-methoxymethyl-2,3,9,9a-tetrahydro-oxazolo-[3,2a]-indole, 7-chloro-9,9,9a-trimethyl-2-ethoxymethyl-2,3,9,9a-tetrahydro-oxazolo-[3,2a]-indole, 7-chloro-9,9,9a-trimethyl-2-(n-hexyloxymethyl)-2,3,9,9a-tetrahydro-oxazolo-[3,2a]-indole, 7-chloro-9,9,9a-trimethyl-2-(n-propoxymethyl)-2,3,9,9a-tetrahydro-oxazolo-[3,2a]-indole, 7-chloro-2,9,9,9a-tetramethyl-2,3,9,9a-tetrahydro-oxazolo-[3,2a]-indole, 7-chloro-3,9,9,9a-tetramethyl-2,3,9,9a-tetrahydro-oxazolo-[3,2a]-indole, 9,9,9a-trimethyl-3-chloromethyl-2,3,9,9a-tetrahydro-oxazolo-[3,2a]-indole, 9,9,9a-trimethyl-2-ethyl-2,3,9,9a-tetrahydro-oxazolo-[3,2a]-indole, 9,9,9a-trimethyl-7-phthalimidomethyl-2,3,9,9a-tetrahydro-oxazolo-[3,2a]-indole, 9,9,9a-trimethyl-7-cyano-2,3,9,9a-tetrahydro-oxazolo-[3,2a]-indole, 2,9,9,9a-tetramethyl-7-cyano-2,3,9,9a-tetrahydro-oxazolo-[3,2a]-indole, 2,3,9,9,9a-pentamethyl-2,3,9,9a-tetrahydro-oxazolo-[3,2a]-indole, 9,9,9a-trimethyl-7-cyano-2-phenoxymethyl-2,3,9,9a-tetrahydro-oxazolo-[3,2a]-indole, 5,6-benzo-9,9,9a-trimethyl-2,3,9,9a-tetrahydro-oxazolo-[3,2a]-indole, 6,7-benzo-9,9,9a-trimethyl-2,3,9,9a-tetrahydro-oxazolo-[3,2a]-indole, 2,9,9,9a-tetramethyl-7-cyclohexyl-2,3,9,9a-tetrahydro-oxazolo-[3,2a]-indole and 3,9,9,9a-tetramethyl-7-cyclohexyl-2,3,9,9a-tetrahydro-oxazolo-[3,2a]-indole.

The above mentioned 9a-methyl-2,3,9,9a-tetrahydro-oxazolo[3,2a]-indoles of the formula

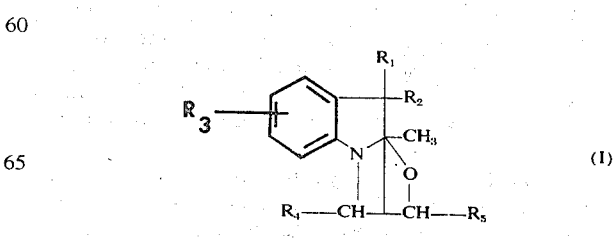

(I)

are prepared by alkylating an indolenine of the formula

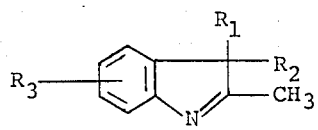 (Ia)

with oxiranes of the formula

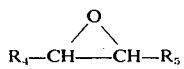 (Ib)

in which $R_1$, $R_2$, $R_3$, $R_4$ and $R_5$ have the meaning given above.

The reaction can be carried out in bulk or in the presence of substances which react acid or alkaline, with or without the addition of water. Instead of water, organic solvents can also be used; at times it is useful to use a mixture of water and one or more organic solvents.

Organic acids which are suitable in the preparation of the starting materials of the formula (I) are, for example, formic acid, acetic acid, propionic acid, monochloroacetic and dichloroacetic acid, β-chloropropionic acid, succinic acid, benzoic acid and p-toluene-sulphonic acid. Organic and inorganic acids can also be used as mixtures; in this case, aqueous hydrochloric acid, sulphuric acid, nitric acid and phosphoric acid are particularly suitable.

Possible substances which give an acid reaction are also Lewis acids, such as $ZnCl_2$, $SnCl_4$, $AlCl_3$, $BF_3$ and $FeCl_3$, which are preferably used together with organic acids, for example those from post-sulphonated styrenedivinylbenzene copolymers.

As organic solvents, the following can, for example, be used: methanol, ethanol, ethylene glycol, benzyl alcohol, acetone, isopropyl methyl ketone, methyl ethyl ketone, cyclohexanol, tetrahydrofurane, dioxane, ethyl acetate, phthalic acid diethyl ester, phthalic acid n-propyl ester, cyclohexane, cyclohexene, benzene, xylenes, chlorobenzene or ethylene chloride.

The reaction is preferably carried out in acetic acid and particuarly preferably in acetic acid-water mixtures.

The reaction can be carried out at temperatures between about —20° and +180°C, preferably at temperatures between 25° and 80°C. Especially in the case of low-boiling oxiranes, such as ethylene oxide, propylene oxide, butylene-(1,2) oxide and 1-chloro-2,3-epoxypropane, the reaction can advantageously be carried out under pressure.

It has now been found that compounds of the formula II or of the formulae which have been singled out are, surprisingly, suitable for use as aldehyde components in condensation reactions for the manufacture of basic dyestuffs.

A preferred group amongst the dyestuffs of the formula III are those of the formula

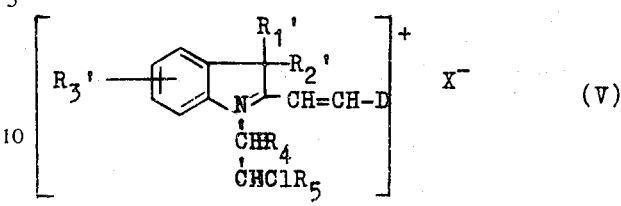 (V)

wherein $R_1'$ represents methyl, ethyl or n-propyl, $R_2'$ represents methyl, ethyl or n-propyl, $R_3'$ represents hydrogen or one or more identical or different radicals from amongst methyl, ethyl, n-propyl, tert.-butyl, n-hexyl, n-dodecyl, cyclohexyl, fluorine, chlorine, phenyl, 4-nitrophenyl, 4-methoxyphenyl, benzyl, trifluoromethyl, nitrile, carboxyl, methylmercapto, ethylmercapto, methylsulphonyl, acetamino, methoxy, ethoxy, n-propoxy, n-butoxy, phenoxy, carbophenoxy, allyloxy or sulphamoyl and D, $R_4$, $R_5$ and $X^-$ have the abovementioned meaning.

Within the framework of the dyestuffs of the formula V, preferred dyestuffs are those of the formula

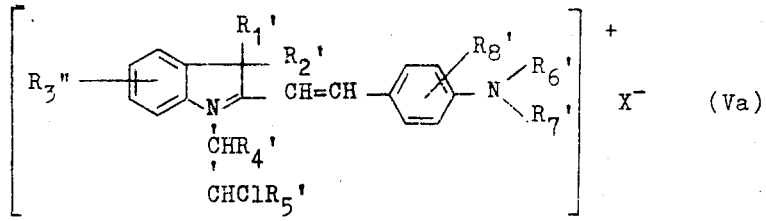 (Va)

wherein $R_1'$, $R_2'$, $R_4'$, $R_5$ and $X^-$ have the abovementioned meaning, $R_3''$ represents hydrogen, methyl, ethyl, n-propyl, iso-propyl, n-butyl, n-hexyl, n-dodecyl, fluorine, chlorine, trifluoromethyl, nitrile, carboxyl, methylmercapto, ethylmercapto, methylsulphonyl, acetamino, carbomethoxy, carboethoxy, sulphamoyl, methylmercapto, ethylmercapto, methylsulphonyl, acetamino, cyclohexyl, phenyl, 4-nitrophenyl, methoxy, ethoxy, n-propoxy, n-butoxy or phenoxy, $R_6'$ represents methyl, ethyl, n-propyl, n-butyl, β-cyanoethyl, β-chloroethyl, β-hydroxyethyl or β-methoxyethyl, $R_7'$ represents hydrogen, methyl, ethyl, n-propyl, n-butyl, β-cyanoethyl, β-chloroethyl, β-hydroxyethyl, β-methoxyethyl, cyclohexyl or methylcyclohexyl or the radicals $R_6'$ and $R_7'$ together with the N-atom form a piperidine, morpholine, piperazine or thiazine ring, and $R_8'$ represents hydrogen or one or more identical or different chlorine, bromine, methyl, ethyl, n-propyl, nitrile, methoxy, ethoxy, n-propoxy, iso-propoxy or n-butoxy radicals.

Further preferred dyestuffs are those of the formula

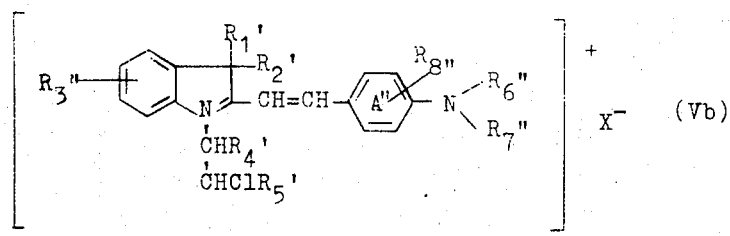

in which
R$_1'$, R$_2'$, R$_3''$, R$_4'$, R$_5'$ and X$^-$ have the abovementioned meaning and R$_6''$ represents an aromatic radical which can be linked to the ring A'' directly or via O, S, N-alkyl or N-aralkyl or via a methylene group and R$_7''$ represents hydrogen, methyl or ethyl and R$_8''$ represents hydrogen or one or more fluorine, chlorine, bromine, methyl, ethyl, n-propyl, iso-propyl, n-butyl, methoxy, ethoxy, n-propoxy, acetamino or nitrile radicals.

Further dyestuffs to be highlighted from amongst those of the formula V are those of the formula

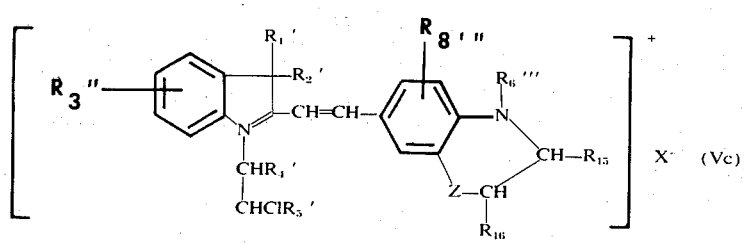

wherein
R$_1'$, R$_2'$, R$_3''$, R$_4'$, R$_5'$ and X$^-$ have the abovementioned meaning, R$_6'''$ represents methyl, ethyl, n-propyl, iso-propyl, n-butyl, cyanoethyl, β-chloroethyl, β-methoxyethyl or β-ethoxyethyl, R$_8'''$ represents hydrogen or one or more identical or different radicals from amongst fluorine, chlorine, methyl, ethyl, n-propyl, nitrile, methoxy, ethoxy, n-propoxy, iso-propoxy or n-butoxy, and Z represents a single bond, an O atom or S atom, a methylene group or an ethylidene group, or >N-CH$_3$, >N-C$_2$H$_5$, >N-n-C$_3$H$_7$ or >N-n-C$_4$H$_9$, R$_{15}$ represents hydrogen, methyl, ethyl, n-propyl, iso-propyl, n-butyl, n-hexyl or cyclohexyl and R$_{16}$ represents hydrogen, methyl, ethyl, n-propyl, iso-propyl, n-butyl, n-hexyl or cyclohexyl and R$_{15}$ and R$_{16}$ together can form a 5-membered or 6-membered ring and represent a trimethylene or tetramethylene bridge which is optionally substituted by methyl, ethyl, n-propyl, methoxy or ethoxy.

Amongst the dyestuffs of the formula Vc, those in which Z represents a single bond should be particularly singled out. A further preferred group within the framework of the dyestuffs of the formula V corresponds to the formula

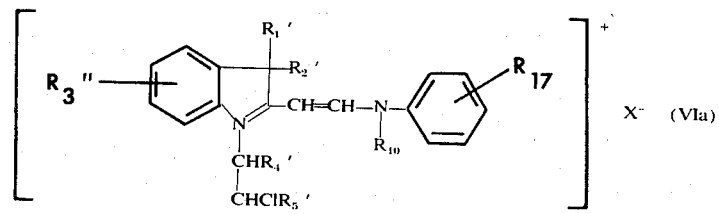

in which
R$_1'$, R$_2'$, R$_3''$, R$_4'$, R$_5'$ and X$^-$ have the abovementioned meaning and R$_{17}$ represents hydrogen or one or more identical or different radicals from amongst fluorine, chlorine, methyl, ethyl, n-propyl, iso-propyl, n-butyl, iso-butyl, tert.-butyl, n-nonyl, n-dodecyl, tetrapropylene, methoxy, ethoxy, n-propoxy, iso-propoxy, n-dodecyloxy, tetrapropyleneoxy, benzyl, nitro or nitrile and R$_{10}'$ represents hydrogen, methyl or ethyl.

A further preferred group amongst the dyestuffs of the formula V in which the radical D represents

are those of the formula

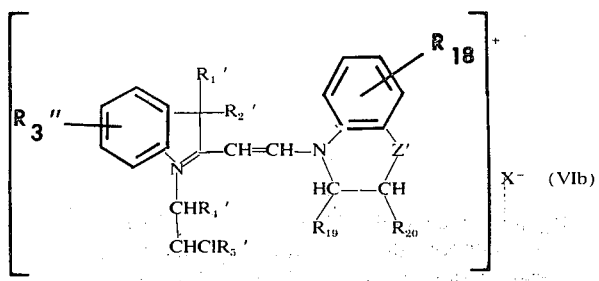

in which
R₁', R₂', R₃'', R₄', R₅' and X⁻ have the abovementioned meaning and

R₁₈ represents hydrogen or one or more identical or different radicals from amongst chlorine, methyl, ethyl, n-propyl, iso-propyl, n-butyl, tert.-butyl, methoxy, ethoxy, n-propoxy, iso-propoxy, amino, acetamino, n-propionylamino, dimethylamino, diethylamino or di-(β-hydroxyethyl)-amino, R₁₉ represents hydrogen, methyl, ethyl, n-propyl, iso-propyl, n-butyl, n-hexyl or cyclohexyl and R₂₀ represents hydrogen, methyl, ethyl, n-propyl, iso-propyl, n-butyl, n-hexyl and cyclohexyl, or R₁₉ and R₂₀ conjointly form a 5-membered or 6-membered ring and represent a trimethylene or tetramethylene bridge which is optionally substituted by methyl, ethyl, n-propyl, methoxy or ethoxy and Z' represents a single bond, O or S, a methylene or ethylidene group, >NH, >N-CH₃, >N-C₂H₅, >N-n-C₃H₇ or >N-n-C₄H₉.

A preferred group amongst the dyestuffs of the formula V in which D represents the radical

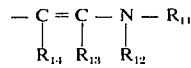

are those of the formula

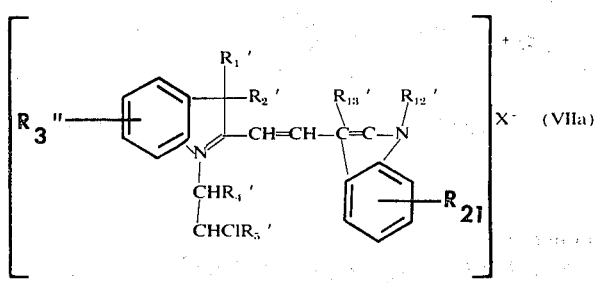

in which
R₁', R₂', R₃'', R₄', R₅' and X⁻ have the abovementioned meaning,

R₁₂' represents hydrogen, methyl, ethyl, n-propyl, β-cyanoethyl or β-methoxyethyl, R₁₃' represents hydrogen, methyl, ethyl, phenyl, 4'-methoxyphenyl, 4'-chlorophenyl, 4'-ethoxyphenyl or 4'-methylphenyl and R₂₁ represents hydrogen, one or more identical or different radicals from amongst chlorine, methyl, ethyl, n-propyl, iso-propyl, n-butyl, nitro, methoxy and ethoxy, or the remaining part of a benzo-ring.

Further, those dyestuffs of the formula V should be singled out which correspond to the formula

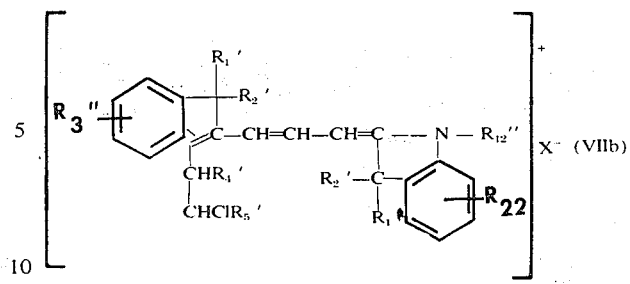

wherein
R₁', R₂', R₃'', R₄', R₅' and X⁻ have the abovementioned meaning,

R₁₂'' represents methyl, ethyl or δ-chlorobutyl and

R₂₂ represents hydrogen or one or more identical or different radicals from amongst chlorine, fluorine, trifluoromethyl, methyl, ethyl, n-propyl, iso-propyl, n-butyl, tert.-butyl, methoxy, ethoxy, carboxyl, carbomethoxy, carboethoxy, acetamino, nitrile or nitro.

In place of the aldehydes of the formula II, their functionally equivalent derivatives can also be employed, such as the primary products of the Vilsmeier reaction, Schiff's bases, azomethines, oximes, nitrones or hydrazones, which furthermore are obtainable from the corresponding aldehydes analogously to known processes.

The dyestuffs of the formulae Va, b and c as well as VIIa and VIIb are obtained if compounds of the formula

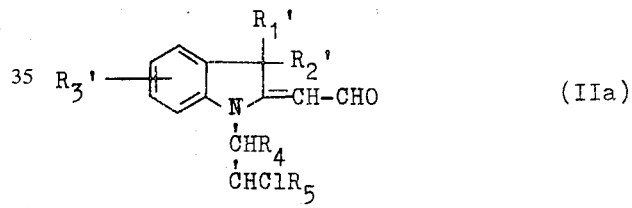

in which
R₁', R₂', R₃', R₄ and R₅ have the abovementioned meaning, are reacted with compounds of the formulae

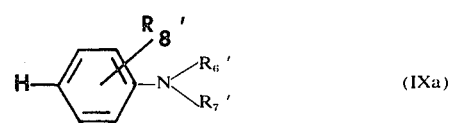

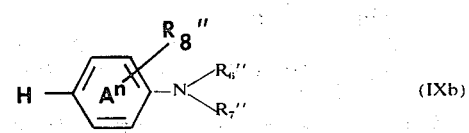

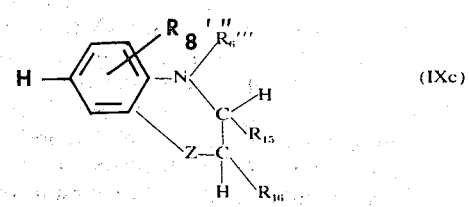

-Continued

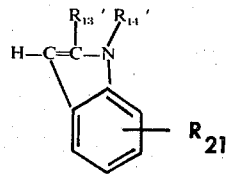
(Xa)

or

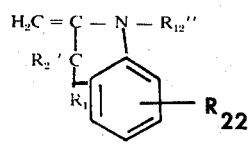
(Xb)

wherein
$R_6'$, $R_6''$, $R_6'''$, $R_7'$, $R_7''$, $R_8'$, $R_8''$, $R_8'''$, $R_{12}''$, $R_{13}'$, $R_{14}'$, $R_{15}$, $R_{16}$, $R_{21}$, $R_{22}$, $A''$ and $Z$ have the abovementioned meaning, in the presence of acid condensation agents, in accordance with known methods. Suitable condensation agents are, for example, formic acid, acetic acid, propionic acid, acetic anhydride, propionic anhydride, sulphuric acid, hydrochloric acid, phosphoric acid, polyphosphoric acid, phosphorus oxychloride, phosphorus pentoxide, thionyl chloride, $AlCl_3$, $ZnCl_2$, $BF_3$, $PCl_5$, $PCl_3$ or mixtures thereof. The reaction can also be carried out in the presence of water or of organic solvents such as benzene, toluene, xylene, acetonitrile, propionitrile, chlorobenzene, dichlorobenzene, methanol, ethanol, n-propanol, iso-propanol, n-butanol or iso-butanol.

A preferred embodiment is the condensation in glacial acetic acid, in aqueous sulphuric acid, in aqueous hydrochloric acid or with the further addition of zinc chloride.

Dyestuffs of the formulae VIa and b are obtained if compounds of the formula

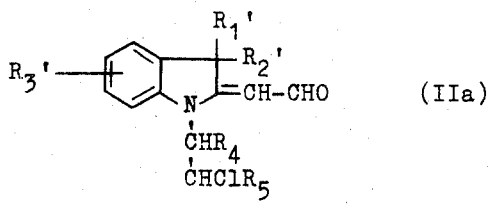
(IIa)

in which
$R_1'$, $R_2'$, $R_3'$, $R_4$ and $R_5$ have the abovementioned meaning,
are reacted with compounds of the formula

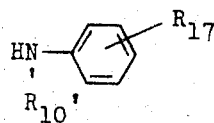
(XIa)

or

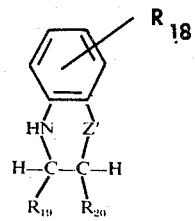
(XIb)

wherein
$R_{10}'$, $R_{17}$, $R_{18}$, $R_{19}$, $R_{20}$ and $Z'$ have the abovementioned meaning, in the presence of acid condensation agents, in accordance with known methods. Suitable agents for this purpose are, for example: formic acid, acetic acid, propionic acid, sulphuric acid, hydrochloric acid, phosphoric acid, polyphosphoric acid, acetic anhydride, propionic anhydride, $ZnCl_2$ or $BF_3$ or mixtures thereof. The reaction can also be carried out in the presence of water or of organic solvents. Condensations in the absence of water should be singled out. In particular, the condensations with compounds of the formulae XIa and XIb are carried out in glacial acetic acid.

Suitable components according to the formula II for the manufacture of dyestuffs according to the invention are, for example, the 1-(2'-chloroalkyl)-2-formylmethylene-3,3-dialkyl-2,3-dihydroindoles which are obtained from the oxazolo[3,2a]-indoles which have been listed.

Suitable components according to the formula IXa are: N,N-dimethyl-aniline, N-methyl-N-ethyl-aniline, N,N-diethylaniline, N,N-di-n-propyl-aniline, N-methyl-N-(n)-propyl-aniline, N,N-di-n-butyl-aniline, N-methyl-N-β-hydroxyethyl-aniline, N-ethyl-N-β-hydroxyethyl-aniline, N-methyl-N-β-chloroethylaniline, N-ethyl-N-β-chloroethyl-aniline, N,N-di-β-hydroxyethylaniline, N,N-di-β-chloroethyl-aniline, N-methyl-N-β-cyanoethylaniline, N-ethyl-N-β-cyanoethyl-aniline, N-methyl-N-β-cyanoethyl-3-methyl-aniline, N-methyl-N-cyclohexyl-aniline, N-ethyl-N-β-chloroethyl-3-methyl-aniline, N-butyl-N-β-chloroethyl-aniline, N-butyl-N-β-hydroxyethyl-aniline, N-ethyl-N-(2'-dimethylaminoethyl)-aniline, N,N-dimethyl-o-toluidine, N,N-dimethyl-m-toluidine, N-ethyl-N-β-hydroxyethyl-m-toluidine, N-ethyl-N-benzyl-aniline, N-phenyl-morpholine, N-phenyl-piperidine, N,N-di-(2',3'-dihydroxypropyl)-aniline, N,N-dimethyl-3-chloroaniline, N,N-dimethyl-3-nitro-aniline, N,N-dibenzyl-aniline, N,N-dibenzyl-m-toluidine, 1-dimethylamino-naphthalene, 3-N,N-dimethylamino-acetanilide, 3-N,N-diethylamino-phenetol and 1-phenyl-4-methyl-piperazine.

Suitable components according to the formula IXb are: diphenylamine, 4-methyldiphenylamine, 4-chlorodiphenylamine, 4-methoxydiphenylamine, 4-ethoxydiphenylamine, N-methyldiphenylamine, N-methyl-4-chlorodiphenylamine, N-methyl-4-methoxydiphenylamine, N-methyl-4-ethoxydiphenylamine, N-methyl-4methyldiphenylamine, N-ethyldiphenylamine, N-ethyl-4-chlorodiphenylamine, N-ethyl-4-methoxydiphenylamine, N-ethyl-4-ethoxydiphenylamine, N-ethyl-4-ethoxy-3'-methyldiphenylamine, N-methyl-4-ethoxy-2'-methyldiphenylamine, 2-nitro-4-methyldiphenylamine, N-methylcarbazole, N-ethylcarbazole, N-(n)-propylcarbazole, N-(n)-butylcarbazole, N-isobutylcarbazole, 3-acetamino-9-methylcarbazole, 9,10-dihydroacridine, phenothiazine, phenoxazine, phenazine, 2-methylphenoxazine, 3-nitrocarbazole, 3-acetylamino-9-methylcarbazole, 3-acetylamino-9-ethylcarbazole, 3-acetylamino-9-(n)-propylcarbazole, 3-propionylamino-9-ethylcarbazole and 3-benzoylamino-9-ethylcarbazole.

As components according to the formula IXc, there may be mentioned: 1-methyl-1,2,3,4-tetrahydroquinoline, 1-ethyl-1,2,3,4-tetrahydroquinoline, 1,2-dimethyl-2,3-dihydroindole, 1-ethyl-2-methyl-2,3-dihydroindole, 1,2,3,3-tetramethyl-2,3-dihydroindole, 1,2,3,3-tetramethyl-6-chloro-2,3-dihydroindole, 1,2,3,3-tetramethyl-7-chloro-2,3-dihydroindole, 1-ethyl- 2,3,3-trimethyl-2,3-dihydroindole, 1-ethyl-2,3,3-trimethyl-6-chloro-2,3-dihydroindole, 1,2-dimethyl-3,3-diethyl-2,3-dihydroindole, 1,2,3,4-tetrahydro-1,2,3,4-tetramethyl-quinoxaline, 1,2,3,4-tetrahydro-1,2,3,4-tetramethyl-6-methoxy-quinoxaline, 1,2,3,4,4a,9a-hexahydro-9-methylcarbazole, 1,2,3,4,4a-hexahydro-9-ethylcarbazole, 1,2,3,4-tetrahydro-1,4-dimethyl-quinoxaline and 1,2,3,4-tetrahydro-2,3-dimethyl-1,4-diethylquinoxaline.

Suitable components according to the formula Xa are: indole, 2-phenylindole, 1-methyl-2-phenylindole, 1-ethyl-2-phenylindole, 1-(n)-propyl-2-phenylindole, 1-cyanoethyl-2-phenylindole, 1-methyl-5-methoxy-2-phenylindole, 1-methyl-5-chloroindole, 1,5-dimethyl-2-phenylindole, 2-methyl-7-ethylindole, 2-methyl-7-iso-propylindole, 5-nitro-2-methyl-7-ethylindole, 7-ethyl-2-phenylindole, 1-ethyl-2-methyl-6,7-benzoindole, 2,5-dimethylindole, 1,2-dimethylindole, 2-methylindole, 1-β-chloroethylindole, 1-β-chloroethyl-2-methylindole, 1-β-chloroethyl-2-phenylindole, 1-β-cyanoethyl-2-methylindole and 2-(4′-chlorophenyl)-7-ethylindole.

The following can be used as starting components according to the formula Xb for the manufacture of dyestuffs of the formula VIIb: 1,3,3-trimethyl-2-methylene-2,3-dihydroindole, 1-methyl-3,3-diethyl-2-methylene-2,3-dihydroindole, 1,3,3-triethyl-2-methylene-2,3-dihydroindole, 1,3,3-trimethyl-5-chloro-2-methylene-2,3-dihydroindole, 1,3,3,5-tetramethyl-2-methylene-2,3-dihydroindole, 1,3,3-trimethyl-5-methoxy-2-methylene-2,3-dihydroindole, 1,3,3-trimethyl-5-nitro-2-methylene-2,3-dihydroindole, 1,3,3-trimethyl-5-acetylamino-2-methylene-2,3-dihydroindole, 1,3,3-trimethyl-5-phthalimido-methyl-2-methylene-2,3-dihydroindole, 1,3,3-trimethyl-5-ethoxy-2-methylene-2,3-dihydroindole, 1,3,3-trimethyl-5-trifluoromethyl-2-methylene-2,3-dihydroindole, 1,3,3-trimethyl-5-carbomethoxy-2-methylene-2,3-dihydroindole, 1,3,3-trimethyl-5-ethyl-2-methylene-2,3-dihydroindole, 1,3,3-trimethyl-5-carboethoxy-2-methylene-2,3-dihydroindole, 1,3,3-trimethyl-5-carboxy-2-methylene-2,3-dihydroindole and 1,3,3-trimethyl-5-fluoro-2-methylene-2,3-dihydroindole.

Suitable components according to the formula XIa are: p-anisidine, m-anisidine, p-toluidine, m-toluidine, 4-ethylaniline, 4-butoxy-aniline, p-phenetidine, 4-isopropyl-aniline, 4-(n)-propyl-aniline, 4-tert.-butyl-aniline, N-methyl-aniline, aniline, 4-chloro-aniline, 4-(n)-butyl-aniline, 4-iso-butylaniline, 4-dodecyl-aniline, 4-(n)-propoxy-aniline, 4-isopropoxy-aniline, 4-benzyl-aniline, 4-methoxy-N-methyl-aniline, 4-methoxy-N-ethyl-aniline, 4-fluoro-aniline, 4-methyl-N-ethylaniline, 4-methyl-N-methyl-aniline, 3,4-dimethyl-aniline, 2,4-dimethyl-aniline, 3-chloro-aniline, 2-chloro-N-ethylaniline, 2,6-dichloro-aniline, 3,5-dichloro-aniline, 3-nitroaniline, 4-chloro-3-methyl-aniline, 3-chloro-4-methyl-aniline and 2,5-dimethyl-aniline.

Suitable components according to the formula XIb are: 2-methyl-2,3-dihydroindole, 2-methyl-7-ethyl-2,3-dihydroindole, 2,3-dimethyl-2,3-dihydroindole, 2-ethyl-3-methyl-2,3-dihydroindole, 2,3,5-trimethyl-2,3-dihydroindole, 5-methoxy-2,3-dimethyl-2,3-dihydroindole, 1,2,3,4,4a,9a-hexahydro-carbazole, 1,2,3,4,4a,9a-hexahydro-6-dimethylamino-carbazole, 1,2,3,4-tetrahydro-2,3-dimethyl-quinoxaline, 1,2,3,4-tetrahydro-quinoxaline, 1,2,3,4-tetrahydro-2,3,4-trimethyl-quinoxaline, 1,2,3,4-tetrahydro-2,3-dimethyl-6-methoxy-quinoxaline, 1,2,3,4-tetrahydro-2,3-dimethyl-4-ethyl-quinoxaline, 1,2,3,4-tetrahydro-quinoline, 6-methoxy-1,2,3,4-tetrahydro-quinoline, 1,2,3,4,4a, 9a-hexahydro-phenazine and 1,2,3,4,4a,9a-hexahydrophenoxazine.

If mixtures of compounds of the formula IIa are used, mixtures of dyestuff of one of the formulae Va, b and c; VIa and b; VIIa and VIIb are obtained.

The new products are valuable dyestuffs which can be used for dyeing and printing materials of leather, tannin-treated cotton, cellulose, synthetic polyamides and polyurethanes, and for dyeing lignin-containing fibres, such as coir, jute and sisal. They are furthermore suitable for the manufacture of writing fluids, rubber-stamp inks and ball pen pastes and can also be used in flexographic printing.

Suitable material for dyeing with the basic dyestuffs of the above general formulae III, V, Va, b, c, VIa, b, VIIa and b are, in particular, flocks, fibres, filaments, tapes, woven fabrics or knitted fabrics of polyacrylonitrile or of copolymers of acrylonitrile with other vinyl compounds, such as vinyl chloride, vinylidene chloride, vinyl fluoride, vinyl acetate, vinylpyridine, vinylimidazole and vinyl alcohol, acrylic and methacrylic acid esters and amides, and asymmetrical dicyanoethylene, or flocks, fibres, filaments, tapes, woven fabrics or knitted fabrics of acid-modified aromatic polyesters and acid-modified polyamide fibres. Acid-modified aromatic polyesters are, for example, polycondensation products of sulphoterephthalic acid and ethylene glycol, that is to say polyethyleneglycolterephthalates containing sulphonic acid groups (type DACRON 64 of E.I. DuPont de Nemours and Company), such as are described in Belgian Patent Specification No. 549,179 and U.S. Pat. No. 2,893,816.

Dyeing can be effected from a weakly acid liquor, the goods appropriately being introduced into the dyebath at 40° – 60°c and then being dyed at the boil. It is also possible to dye under pressure at temperatures above 100°C. Furthermore, the dyestuffs can be added to spinning solutions for the manufacture of fibres containing polyacrylonitrile, or can be applied to the unstretched fibre.

The dyeings of the dyestuffs according to the invention, of the formulae III, V, Va, b, c, VIa, b, VIIa and b, on materials of polyacrylonitrile or acid-modified polyester fibres are distinguished by very good fastness to light, wet processing, rubbing and sublimation and by a high affinity to the fibre. The dyestuffs form light-fast pigments with anionic precipitants, such as alumina, tannin and phosphotungstic acids or phosphomolybdic acids, which can be used advantageously in paper printing.

The dyestuffs can be used individually or as mixtures. They are very suitable for dyeing mouldings of polymers or copolymers of acrylonitrile or asymmetrical dicyanoethylene, acid-modified aromatic polyesters or acid-modified synthetic polyamides, in chlorinated hydrocarbons as the dyebath, provided they carry substituents, such as, for example, the tert.-butyl group, which assist the solubility in chlorinated hydrocarbons, or the amine $X^-$ in the formulae III, V, Va, b, c, VIa, b, VIIa and b is the anion of a monobasic organic acid with 4 – 30 carbon atoms.

Such organic acids are, for example: 2-ethylcaproic acid, lauric acid, oleic acid, linoleic acid, a mixture of aliphatic carboxylic acids with 15 – 19 carbon atoms (Versatic Acid 1519), a mixture of aliphatic carboxylic acids with 9 – 11 carbon atoms (Versatic Acid 911), coconut fatty acid first runnings, tetradecanoic acid, undecylenoic acid, dimethylpropanoic acid, dimethylacetic acid, carboxylic acids of which the hydrocarbon chain is interrupted by hetero-atoms, such as nonylphenoltetraethylene-glycol-ether-propionic acid, nonylphenoldiethylene-glycol-ether-propionic acid, dodecyltetraethyleneglycol-ether-propionic acid, 3-(nonyloxy)-propionic acid, 3-(isotridecyloxy)-propionic acid, 3-(isotridecyloxy)-diethylene-glycol-ether-propionic acid, ether-propionic acid from the alcohol mixture with 6 – 10 carbon atoms, nonylphenoxyacetic acid, aromatic carboxylic acids, such as tert.butylbenzoic acid, cycloaliphatic carboxylic acids, such as hexahydrobenzoic acid, cyclohexenecarboxylic acid, abietic acid and sulphonic acids, such as tetrapropylenebenzenesulphonic acid.

Dyestuffs of the abovementioned formulae in which the anion $A^-$ is the anion of one of the acids listed here are particularly preferred.

If the dyestuffs according to the invention are in the form of salts of the monobasic organic acids with 4 – 30 carbon atoms with have been mentioned, concentrated solutions, of good stability, of these dyestuffs in chlorinated hydrocarbons can be manufactured, where appropriate with the addition of polar organic solvents which are completely miscible with chlorinated hydrocarbons, such as butyrolactone, dimethylformamide, methanol, dioxane, acetonitrile, methyl ethyl ketone, nitrobenzene, dimethylsulphoxide, benzonitrile or 2-nitrochlorobenzene.

To manufacture such solutions, the dyestuffs according to the invention, in the form of the free bases or as salts of organic acids with 4 – 30 carbon atoms, are stirred with chlorinated hydrocarbons and monobasic organic acids with 4 – 30 carbon atoms, optionally with the addition of polar organic solvents which are completely miscible with chlorinated hydrocarbons, and optionally at elevated temperature.

In the examples, the relationship of parts by weight to parts by volume is as of a gram to a millilitre.

ILLUSTRATIVE EXAMPLE A

This example illustrates the preparation of a representative 9a-methyl-2,3,9,9a-tetrahydro-oxazo-[3,2a]-indole of the formula I and corresponds to Example 1 of German Patent application P 20 60 614.8, filed Dec. 9, 1970. The preparation of other compounds of the formula I is shown in German Patent Application P 20 60 614.8. A certified copy of the German Application and a translation thereof are part of the file hereof.

EXAMPLE 1

Ethylene oxide is passed into a mixutre of 80 g. of 2,3,3-trimethylindolenine and 400 g. of glacial acetic acid at 40°–45°C for 3½ hours. The reaction mixture is then introduced into 2,000 ml of ice/water and rendered alkaline with concentrated sodium hydroxide solution. The oil which has separated out is taken up in 300 ml of ligroin. The ligroin phase is dried with $Na_2SO_4$, the ligroin is evaporated off and the residue is distilled to yield 74 g of a liquid which passes over at 78°–80°C and 0.1 mm Hg, of the formula

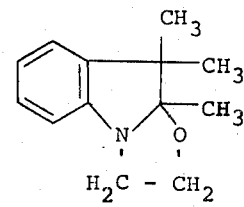

which crystallizes to give a colorless substance of melting point: 44° – 46°.

| Analysis: | C | H | N | O |
|---|---|---|---|---|
| Calculated: | 76.8 | 8.4 | 6.9 | 7.9 |
| Found: | 76.1 | 8.6 | 6.9 | 8.2 |

EXAMPLE 1

25.5 g of dimethylformamide are added dropwise over the course of ½ hour at 30° – 35°C to 40.5 g of phosphorus oxychloride, the mixture is then stirred for a further ½ hour at 45° – 50°C, and 6 g of acetonitrile are subsequently added. 45 g of 9,9,9a-trimethyl-2,3,9,9a-tetrahydro-oxazolo-[3,2a]-indole are then added over the course of 2 hours, whilst keeping the temperature at between 50° and 55°C, and the mixture is subsequently stirred for a further 18 hours at 50°C. It is then stirred into 400 g of ice/water and rendered alkaline with 20% strength sodium hydroxide solution, in the course of which the temperature should not exceed 10°C, and the whole is stirred for a further 5 hours at this temperature and then for a further 15 hours at room temperature, in the course of which the crude product initially obtained as an oil gradually solidifies. Crude yield: 41.5 g.

The crude product can be further purified by redissolving in cyclohexane and precipitating at 0°C. Colourless crystals, which assume a violet colour on the surface after prolonged standing; melting point: 74° – 76°C.

| Analysis: | C | H | N | O | Cl |
|---|---|---|---|---|---|
| calculated: | 67.4 | 6.4 | 5.6 | 6.4 | 14.2 |
| found: | 67.6 | 6.3 | 5.8 | 6.6 | 13.9 |

EXAMPLE 2

15 g of dimethylformamide are added dropwise over the course of ½ hour at 40° – 50°C to 27 g of phosphorus oxychloride, the mixture is then stirred for a further ½ hour at 50° – 60°C, and 4 g of acetonitrile are added. Thereafter, 45 g of 2-phenoxymethyl-9,9,9a-trimethyl-2,3,9,9a-tetrahydro-oxazolo[3,2a]-indole are added in portions over the course of 2 hours and the whole is then stirred for a further 150 hours at 50°C. The reaction product which precipitates after introducing the mixture into ammoniacal ammonium chloride solution is recrystallised from isopropanol with the addition of charcoal and is obtained in good yields. Melting point: 114° – 117°C. Constitution:

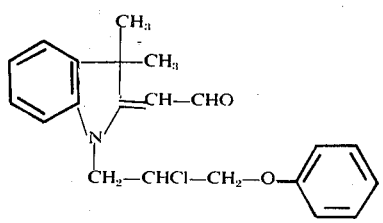

EXAMPLE 3

7.8 g of dimethylformamide are added over the course of ½ hour at 40° – 50°C to 14 g of phosphorus oxychloride, the mixture is then stirred for a further ½ hour at 50° – 60°C and 2 g of acetonitrile are added. 16.2 g of 7methoxy-9,9,9a-trimethyl-2,3,9,9a-tetrahydro-oxazolo-[3,2a]-indole are then added dropwise at 50° – 60°C over the course of 1 hour, the reaction mixture is subsequently stirred for a further 15 hours at 50°C and then poured into ammoniacal ammonium chloride solution, and the whole is first stirred for 2 hours at 0°C and then, after addition of 150 ml of 20% strength NaOH, for a further 12 hours at room temperature. The crude product which precipitates is recrystallised from methanol with the addition of charcoal. Melting point: 107° – 109°C. Constitution:

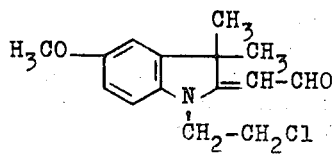

| Analysis:   | C    | H   | N   | O    | Cl   |
|-------------|------|-----|-----|------|------|
| calculated: | 64.4 | 6.4 | 5.0 | 11.4 | 12.8 |
| found:      | 63.4 | 6.7 | 5.2 | 11.4 | 12.8 |

EXAMPLE 4

2.5 g of 1-(2'-chloroethyl)-2-(formylmethylene)-3,3-dimethyl-2,3-dihydroindole are stirred with 1.5 g of N-diethylaniline in 20 ml of chlorobenzene and 1.5 g of phosphorus oxychloride for 2 hours at 70°C. The solvents are stripped off in steam and the residue is poured into 5% strength sodium chloride solution with stirring. The crude dyestuff which precipitates is recrystallised from 5% strength sodium chloride solution. It corresponds to the formula

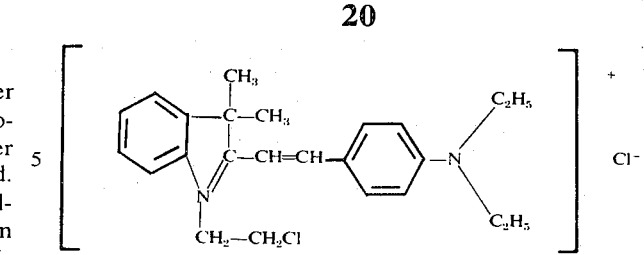

and dyes materials of polyacrylonitrile in violet shades.

EXAMPLE 5

1.6 g of N-phenyl-morpholine and 2.4 g of 1-(2'-chloroethyl)-2-formylmethylene-3,3-dimethyl-2,3-dihydroindole in 200 ml of glacial acetic acid are stirred for 10 hours at 80°C. The reaction mixture is poured into 100 ml of 20% strength sodium chloride solution with stirring, and the dyestuff which separates out is separated off and dried in vacuo at 60°C. The dyestuff corresponds to the formula

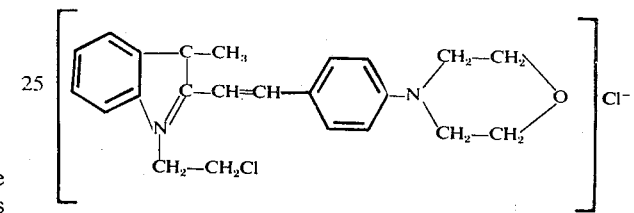

and dyes materials of polyacrylonitrile in red-violet shades.

EXAMPLE 6

2.5 g of 1-(2'-chloroethyl)-2-(formylmethylene)-3,3-dimethyl-2,3-dihydroindole are stirred with 2.3 g of 4-ethoxy-N-methyl-diphenylamine in 20 ml of chlorobenzene and 1.5 g of phosphorus oxychloride for 2 hours at 70°C. The solvents are stripped off in steam and the residue is poured into 5% strength sodium chloride solution with stirring. The crude dyestuff which precipitates is purified by reprecipitation from water/5% strength sodium chloride solution. It corresponds to the formula

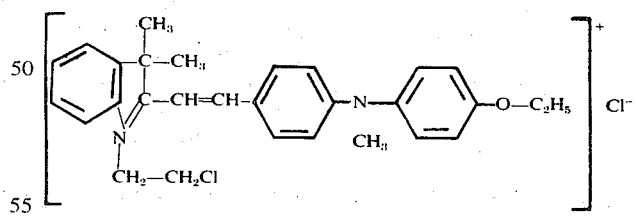

and dyes materials of polyacrylonitrile in violet shades

EXAMPLE 7

2.2 g of 1-methyl-1,2,3,4-tetrahydro-quinoline are stirred with 3.7 g of 1-(2'-chloroethyl)-2-formylmethylene-3,3-dimethyl-2,3-dihydroindole in 30 ml of glacial acetic acid for 8 hours at 100°C. The reaction mixture is poured into 150 ml of 20% strength sodium chloride solution with stirring and the product is purified by reprecipitation from water/sodium chloride solution and is dried at 60°C in vacuo. The dyestuff corresponds to the formula

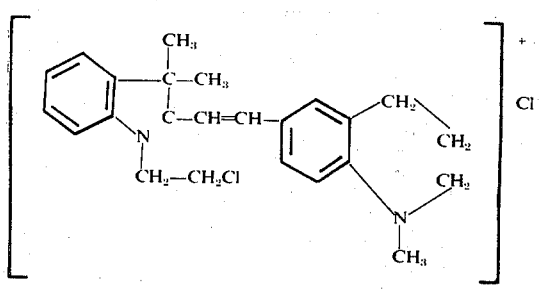

and dyes materials of polyacrylonitrile in red-violet shades.

If one of the instructions indicated in Examples 4, 5, 6 or 7 is followed, dyestuffs are obtained which dye materials of polyacrylonitrile in the colour shades indicated in Table 1.

The crude product which precipitates after pouring the mixture into 200 ml of 10% strength aqueous sodium chloride solution and stirring for 10 hours is purified by crystallisation from 2.5% strength sodium chloride solution in the presence charcoal. The dyestuff corresponds to the formula

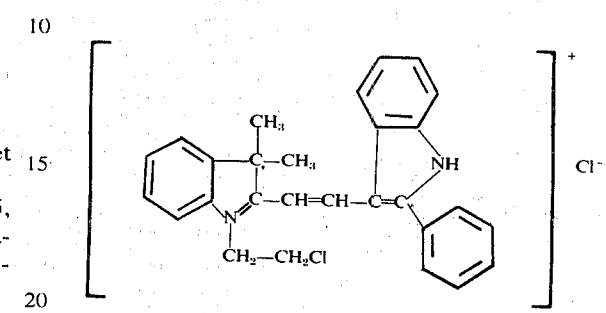

Table 1

| Aldehyde Component | CH-acid Component | Colour shade |
|---|---|---|
| 1-(2'-chloroethyl)-2-(formyl-methylene)-3,3-dimethyl-2,3-dihydroindole | N-dimethyl-aniline | bluish-tinged red |
| " | N-(methyl)-β-hydroxyethyl)-aniline | bluish-tinged red |
| " | N-(di-β-hydroxyethyl)-aniline | bluish-tinged red |
| " | N-(methylβ-chloroethyl)-aniline | bluish-tinged red |
| " | N-(ethyl-β-chloroethyl)-aniline | bluish-tinged red |
| " | N-(di-β-chloroethyl)-aniline | bluish-tinged red |
| " | N-(methyl-cyanoethyl)-aniline | bluish-tinged red |
| " | N-(methyl-cyanoethyl)-3-methyl-aniline | bluish-tinged red |
| " | N-(methyl-cyclohexyl)-aniline | bluish-tinged red |
| " | N-(ethyl-β-chloroethyl)-3-methyl-aniline | bluish-tinged red |
| " | N-(di-n-propyl)-aniline | bluish-tinged red |
| " | N-(n-butyl-β-chloroethyl)-aniline | bluish-tinged red |
| " | N-(n-butyl-β-hydroxyethyl)-aniline | bluish-tinged red |
| " | ethyl-(2-dimethylaminoethyl)-aniline | bluish-tinged red |
| " | N-dimethyl-o-toluidine | bluish-tinged red |
| " | N-dimethyl-m-toluidine | bluish-tinged red |
| " | N-(ethyl-β-hydroxyethyl)-m-toluidine | bluish-tinged red |
| " | N-(ethyl-benzyl)-aniline | violet |
| " | N-phenyl-morpholine | bluish-tinged red |
| " | N-methyl-diphenylamine | bluish-tinged red |
| " | N-methyl-4-ethoxy-diphenylamine | violet |
| " | N-methyl-4-methoxy-diphenylamine | violet |
| " | N-ethyl-diphenylamine | bluish-tinged red |
| " | N-ethyl-4-ethoxy-diphenylamine | violet |
| " | N-methyl-4-methyl-diphenylamine | bluish-tinged red |
| " | N-methyl-2-methyl-4'-ethoxy-diphenylamine | violet |
| " | 4-ethoxy-diphenylamine | violet |
| " | 2-nitro-4-methyl-diphenylamine | bluish-tinged red |
| " | 4-methyl-diphenylamine | bluish-tinged red |
| " | N-ethyl-carbazole | yellowish-tinged red |
| " | 1,2,3,4-tetrahydro-9-methyl-carbazole | bluish-tinged red |
| " | 1,2,3,4-tetrahydro-8-chloro-carbazole | bluish-tinged red |
| " | 3-acetamino-9-methyl-carbazole | red |
| " | N-methyl-carbazole | yellowish-tinged red |
| " | N-propylcarbazole | yellowish-tinged red |

EXAMPLE 8

2.3 g of 1-(2'-chloroethyl)-2-(formylmethylene)-3,3-dimethyl-2,3-dihydroindole are reacted with 2.0 g of 2-phenylindole in 30 ml of glacial acetic acid, after addition of 1 ml of acetic anhydride, for 2 hours at 80°C.

and dyes materials of polyacrylonitrile in scarlet-red shades of good fastness to light.

On following the same procedure and reacting the aldehydes listed in Table 2 with the amine components listed, dyestuffs are obtained which dye materials of polyacrylonitrile in the shades indicated:

Table 2

| Aldehyde Component | Indole Component | Colour shade |
|---|---|---|
| 1-(2'-chloroethyl)-2-(formylmethylene)-3,3-dimethyl-2,3-dihydroindole | indole | orange |
| " | 2-phenylindole | orange |
| " | 1-methyl-2-phenylindole | orange |
| " | 1-methyl-5-methoxy-2-phenylindole | orange |
| " | 1-methyl-5-chloro-indole | yellowish-tinged orange |
| " | 1,5-dimethyl-2-phenylindole | orange |
| " | 2-methyl-7-ethyl-indole | orange-yellow |
| " | 2-methyl-7-iso-propyl-indole | orange-yellow |
| " | 5-nitro-2-methyl-7-iso-propyl-indole | orange |
| " | 5-nitro-2-methyl-7-ethyl-indole | orange |
| " | 2-phenyl-7-ethyl-indole | orange |
| " | 2-(4'-chlorophenyl)-7-ethyl-indole | orange |
| " | 1-ethyl-2-methyl-6,7-benzo-indole | bluish-tinged red |
| 1-(2'-chloroethyl-2-(formylmethylene)-3,3-dimethyl-5-methoxy-2,3-dihydroindole | 2-phenylindole | red-orange |
| " | 1-methyl-2-phenylindole | red-orange |
| " | 1-methyl-5-methoxy-2-phenylindole | red-orange |
| " | 1-methyl-5-chloro-2-phenylindole | orange-yellow |
| " | 1,5-dimethyl-2-phenylindole | orange |
| " | 2-methyl-7-ethyl-indole | orange |
| " | 2-(4'-chlorophenyl)-7-ethyl-indole | orange |
| " | 7-ethyl-indole | orange |
| " | 1-ethyl-2-methyl-6,7-benzo-indole | violet |
| 1-(2'-chloro-n-propyl)-2-(formylmethylene)-3,3-dimethyl-2,3-dihydroindole | indole | orange |
| " | 2-phenylindole | orange |
| " | 1-methyl-2-phenylindole | orange |
| " | 1-methyl-5-methoxy-2-phenylindole | orange |
| " | 1-methyl-5-chloro-2-phenylindole | orange-yellow |
| " | 1,5-dimethyl-2-phenylindole | orange |
| " | 2-methyl-7-ethylindole | orange |
| " | 2-phenyl-7-ethylindole | orange |
| " | 1-ethyl-2-methyl-6,7-benzoindole | bluish-tinged red |
| " | 7-ethyl-5-chloro-2-phenylindole | orange-yellow |
| " | 1-methyl-2-methyl-6,7-benzoindole | bluish-tinged red |
| " | 1,5-dimethyl-2-phenylindole | orange-yellow |
| 1-(2'-chloro-3'-phenoxypropyl)-2-(formylmethylene)-3,3-dimethyl-2,3-dihydroindole | 2-phenylindole | orange |
| " | 1-methyl-2-phenylindole | orange |
| " | 1-methyl-5-methoxy-2-phenylindole | orange |
| " | 1-methyl-5-chloro-2-phenylindole | orange-yellow |
| " | 7-ethylindole | orange |
| " | 2-phenyl-7-ethylindole | orange |
| 1-(2'-chloroethyl)-2-(formylmethylene)-5-chloro-3,3-dimethyl-2,3-dihydroindole | 2-phenylindole | orange |
| " | 1-methyl-2-phenylindole | orange |
| " | 2-methylindole | orange-yellow |
| " | 1-methyl-5-methoxy-2-phenylindole | orange |
| " | 1-methyl-5-chloro-2-phenylindole | orange-yellow |
| " | 2-methyl-7-ethylindole | orange-yellow |
| " | 2-phenyl-7-ethylindole | orange |
| " | 1-ethyl-2-methyl-6,7-benzoindole | bluish-tinged red |
| " | 2-(4'-chlorophenyl)-7-ethylindole | orange |
| 1-(2'-chloroethyl)-2-(formylmethylene)-3,3,5-trimethyl-2,3-dihydroindole | 2-phenylindole | orange |
| " | 1,5-dimethyl-2-phenylindole | orange-yellow |
| " | 1-methyl-2-phenylindole | orange |
| " | 1-methyl-5-methoxy-2-phenylindole | orange |
| " | 1-methyl-5-chloro-2-phenylindole | orange-yellow |
| " | 1,5-dimethylindole | orange-yellow |
| " | 1-methylindole | orange-yellow |
| " | 2-methyl-7-ethylindole | orange-yellow |
| " | 2-methyl-7-iso-propylindole | orange-yellow |
| " | 5-nitro-2-methyl-7-ethylindole | red-orange |
| " | 2-phenyl-7-ethylindole | orange |
| " | 1-ethyl-2-methyl-6,7-benzoindole | bluish-tinged red |
| 1-(2'-chloroethyl)-2-(formylmethylene)-5-carbomethoxy-3,3-dimethyl-2,3-dihydroindole | 2-phenylindole | red-orange |
| " | 1-methylindole | orange |
| " | 1-methyl-2-phenylindole | orange |
| " | 1-methyl-5-methoxy-2-phenylindole | red-orange |
| " | 2-methyl-7-ethylindole | orange |
| " | 1-ethyl-2-methyl-6,7-benzoindole | violet |
| " | 2-phenyl-7-ethylindole | red-orange |
| 1-(2'-chloroethyl)-2-(formylmethylene)-5-ethoxy-3,3-dimethyl-2,3-dihydroindole | 2-phenylindole | red-orange |
| " | 1-methyl-2-phenylindole | red-orange |
| " | 1-methyl-5-chloro-2-phenylindole | orange-yellow |
| " | 1,5-dimethyl-2-phenylindole | orange |
| " | 2-methyl-7-ethylindole | orange |
| " | 1-ethyl-2-methyl-6,7-benzoindole | violet |
| " | 7-ethylindole | orange |

Table 2 – Continued

| Aldehyde Component | Indole Component | Colour shade |
|---|---|---|
| 1-(2'-chloroethyl)-2-(formyl-methylene)-5-carboethoxy-3,3-dimethyl-2,3-dihydroindole | 1-methyl-5-methoxy-2-phenylindole | red-orange |
| '' | 2-phenylindole | red-orange |
| '' | 1-methyl-2-phenylindole | red-orange |
| '' | 1-methyl-5-methoxy-2-phenylindole | red-orange |
| '' | 7-ethylindole | orange |
| '' | 1-ethyl-2-methyl-6,7-benzoindole | violet |
| '' | 2-phenyl-7-ethylindole | orange |

EXAMPLE 9

2.5 g of 1-(2'-chloroethyl)-2-(formylmethylene)-3,3-dimethyl-2,3-dihydroindole and 1.7 g of 1,3,3-trimethyl-2-methylene-2,3-dihydroindole in 20 ml of glacial acetic acid are warmed to 80°C for 4 hours and the reaction mixture is then introduced into 200 ml of 20% strength sodium chloride solution. the dyestuff which has separated out after stirring for several hours is separated off and dried in vacuo at 60°C. The dyestuff corresponds to the formula

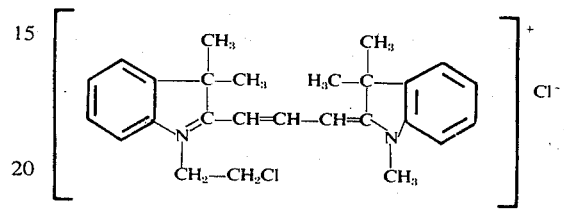

and dyes materials of polyacrylonitrile in red-violet shades.

On following the same procudure, the starting components listed yield dyestuffs which dye materials of polyacrylonitrile in the colour shades indicated in Table 3:

Table 3

| Aldehyde Component | Methylene Component | Colour shade |
|---|---|---|
| 1-(2'-chloroethyl)-2-(formyl-methylene)-3,3-dimethyl-2,3-dihydroindole | 1,3,3-trimethyl-5-chloro-2-methylene-2,3-dihydroindole | bluish-tinged red |
| '' | 1,3,3,5-tetramethyl-2-methylene-2,3-dihydroindole | bluish-tinged red |
| '' | 1,3,3-trimethyl-5-methoxy-2-methylene-2,3-dihydroindole | bluish-tinged red |
| '' | 1,3,3-trimethyl-5-nitro-2-methylene-2,3-dihydroindole | strongly bluish-tinged red |
| '' | 1,3,3-trimethyl-5-ethoxy-2-methylene-2,3-dihydroindole | strongly bluish-tinged red |
| '' | 1,3,3-trimethyl-5-trifluoromethyl-2-methylene-2,3-dihydroindole | bluish-tinged red |
| '' | 1,3,3-trimethyl-5-acetamino-2-methylene-2,3-dihydroindole | strongly bluish-tinged red |
| '' | 1,3,3-trimethyl-5-carbomethoxy-2-methylene-2,3-dihydroindole | strongly bluish-tinged red |
| '' | 1-ethyl-3,3-dimethyl-2-methylene-2,3-dihydroindole | bluish-tinged red |
| '' | 1,3,3-triethyl-2-methylene-2,3-dihydroindole | bluish-tinged red |
| '' | 1-methyl-3,3-triethyl-2-methylene-2,3-dihydroindole | bluish-tinged red |
| '' | 1,3,3-trimethyl-5-ethyl-2-methylene-2,3-dihydroindole | bluish-tinged red |
| '' | 1,3,3-trimethyl-carboethoxy-2-methylene-2,3-dihydroindole | strongly bluish-tinged red |
| 1-(2'-chloro-n-propyl-2-(formylmethylene)-3,3-dimethyl-2,3-dihydroindole | 1,3,3-trimethyl-2-methylene-2,3-dihydroindole | bluish-tinged red |
| '' | 1,3,3-trimethyl-5-chloro-2-methylene-2,3-dihydroindole | bluished-tinged red |
| '' | 1,3,3-trimethyl-5-methoxy-2-methylene-2,3-dihydroindole | strongly bluish-tinged red |
| 1-(2'-chloroethyl)-2-(formyl-methylene)-3,3-dimethyl-5-methoxy-2,3-dihydroindole | 1,3,3-trimethyl-2-methylene-2,3-dihydroindole | strongly bluish-tinged red |
| '' | 1,3,3-trimethyl-2-methylene-5-chloro-2,3-dihydroindole | strongly bluish-tinged red |
| '' | 1,3,3-trimethyl-2-methylene-5-carbo-methoxy-2,3-dihydroindole | strongly bluish-tinged red |
| 1-(2'-chloroethyl)-2-(formyl-methylene)-3,3-dimethyl-5-methyl-2,3-dihydroindole | 1,3,3-trimethyl-2-methylene-2,3-dihydroindole | bluish-tinged red |

EXAMPLE 10

3.6 g of 1-(2'-chloro-3'-phenoxy)-propyl-2-(formylmethylene)-3,3-dimethyl-2,3-dihydroindole and 1.3 g of p-anisidine in 15 ml of glacial acetic acid are warmed to 80°C for 1 hour. The reaction mixture is introduced into 200 ml of 20% strength aqueous sodium chloride solution and stirred for 15 hours, and the crude product which has precipitated is then purified by reprecipitation from 2.4% strength aqueous sodium chloride solution with the addition of charcoal. The dyestuff, which is obtained in reddish-yellow crystals, corresponds to the formula

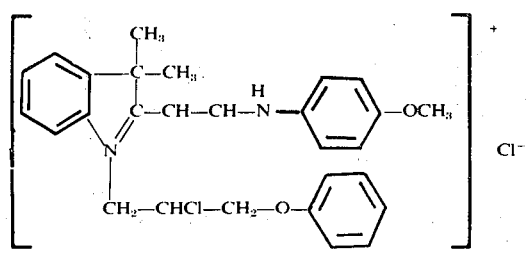

and dyes materials of polyacrylonitrile in yellow shades of good fastness to light.

EXAMPLE 11

2.5 g of 1-(2'-chloroethyl)-2-(formylmethylene)-7-methoxy-3,3-dimethyl-2,3-dihydroindole and 1.2 g of p-toluidine in 20 ml of glacial acetic acid are reacted for 1 hour at 88°C. The crude product which has precipitated after pouring the reaction mixture into 20% strength aqueous sodium chloride solution and stirring for 10 hours is purified by recrystallisation from 10% strength aqueous sodium chloride solution with the addition of charcoal. The dyestuff, which is obtained in yellow crystals, corresponds to the formula

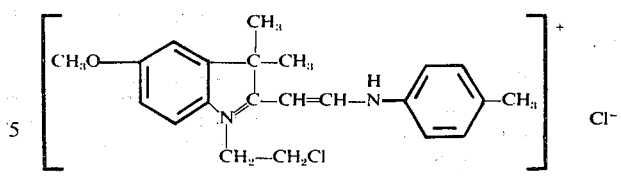

and dyes material of polyacrylonitrile in yellow shades of good fastness to light.

EXAMPLE 12

2.3 g of 1-(2'-chloroethyl)-2-(formylmethylene)-2,3-dimethyl-2,3-dihydroindole, manufactured according to Example 1, are reacted with 1.4 g of 2-methyl-dihydroindole in 15 ml of glacial acetic acid for 1 hour at 70° - 75°C. The reaction mixture is then introduced into 300 ml of 20% strength sodium chloride solution and the whole stirred for 10 hours at room temperature, and the mass which has precipitated is filtered off. After purification by recrystallisation from 5% strength aqueous sodium chloride solution in the presence of charcoal, the dyestuff is obtained in yellow crystals. It corresponds to the formula

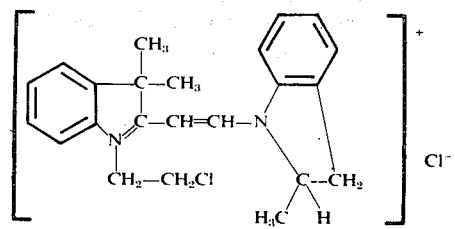

and dyes materials of polyacrylonitrile in yellow shades of good fastness to light.

If the procedure indicated in Examples 10, 11 or 12 is followed, the components listed in Table 4 yield dyestuffs having good fastness properties, which dye materials of polyacrylonitrile in the shades indicated:

Table 4

| Amine Component | Aldehyde Component | Colour shade |
|---|---|---|
| p-anisidine | 1-(2'-chloroethyl)-2-(formylmethylene)-3,3-dimethyl-2,3-dihydroindole | yellow |
| p-toluidine | 1-(2'-chloroethyl)-2-(formylmethylene)-3,3-dimethyl-2,3-dihydroindole | yellow |
| hexahydrocarbazole | 1-(2'-chloroethyl)-2-(formylmethylene)-3,3-dimethyl-2,3-dihydroindole | yellow |
| 4-aminodiphenylmethane | 1-(2'-chloroethyl)-2-(formylmethylene)-3,3-dimethyl-2,3-dihydroindole | yellow |
| 2,3-dimethyl-dihydroindole | 1-(2'-chloroethyl)-2-(formylmethylene)-3,3-dimethyl-2,3-dihydroindole | yellow |
| 2,3-dimethyl-1,2,3,4-tetrahydro-quinoxaline | 1-(2'-chloroethyl)-2-(formylmethylene)-3,3-dimethyl-2,3-dihydroindole | reddish-tinged yellow |
| p-anisidine | 1-(2'-chloroethyl)-2-(formylmethylene)-3,3-dimethyl-5-methoxy-2,3-dihydroindole | yellow |
| 2-methyl-dihydroindole | 1-(2'-chloroethyl)-2-(formylmethylene)-3,3-dimethyl-5-methoxy-2,3-dihydroindole | yellow |
| 2,3-dimethyl-1,2,3,4-tetrahydroquinoxaline | 1-(2'-chloroethyl)-2-(formylmethylene)-3,3-dimethyl-5-methoxy-2,3-dihydroindole | reddish-tinged yellow |
| p-anisidine | 1-(2'-chloro-n-propyl)-2-(formylmethylene)-3,3-dimethyl-2,3-dihydroindole | yellow |
| p-toluidine | 1-(2'-chloro-n-propyl)-2-(formylmethylene)-3,3-dimethyl-2,3-dihydroindole | yellow |
| 2-methyl-dihydroindole | 1-(2'-chloro-n-propyl)-2-(formylmethylene)-3,3-dimethyl-2,3-dihydroindole | yellow |
| p-toluidine | 1-(2'-chloroethyl)-2-(formylmethylene)-3,3-dimethyl-5-phthalimidomethyl-2,3-dihydroindole | yellow |
| p-anisidine | 1-(2'-chloroethyl)-2-(formylmethylene)-3,3-dimethyl-5-phthalimidomethyl-2,3-dihydroindole | yellow |
| 2-methyl-dihydroindole | 1-(2'-chloroethyl)-2-(formylmethylene)-3,3-dimethyl-5-phthalimidomethyl-2,3-dihydroindole | yellow |
| p-toluidine | 1-(2'-chloroethyl)-2-(formylmethylene)-3,3-dimethyl-5-cyano-2,3-dihydroindole | yellow |

Table 4 – Continued

| Amine Component | Aldehyde Component | Colour shade |
|---|---|---|
| hexahydrocarbazole | 1-(2'-chloroethyl)-2-(formylmethylene)-3,3-dimethyl-5-cyano-2,3-dihydroindole | yellow |
| p-toluidine | 1-(2'-chloro-3'-phenoxy-propyl)-2-(formyl-methylene)-3,3-dimethyl-2,3-dihydroindole | yellow |
| 2,3-dimethyl-1,2,3,4-tetra-hydroquinoxaline | 1-(2'-chloro-3'-phenoxy-propyl)-2-(formyl-methylene)-3,3-dimethyl-2,3-dihydroindole | reddish-tinged yellow |
| 2-methyl-dihydroindole | 1-(2'-chloroethyl)-2-(formylmethylene)-3,3-dimethyl-5-chloro-2,3-dihydroindole | yellow |
| hexahydrocarbazole | 1-(2'-chloroethyl)-2-(formylmethylene)-3,3-dimethyl-5-chloro-2,3-dihydroindole | yellow |
| p-anisidine | 1-(2'-chloroethyl)-2-(formylmethylene)-3,3-dimethyl-5-chloro-2,3-dihydroindole | yellow |
| p-toluidine | 1-(2'-chloroethyl)-2-(formylmethylene)-3,3-dimethyl-5-chloro-2,3-dihydroindole | yellow |
| p-anisidine | 1-(2'-chloroethyl)-2-(formalmethylene)-3,3-dimethyl-5-methyl-2,3-dihydroindole | yellow |
| p-toluidine | 1-(2'-chloroethyl)-2-(formylmethylene)-3,3-dimethyl-5-methyl-2,3-dihydroindole | yellow |
| 2-methyl-dihydroindole | 1-(2'-chloroethyl)-2-(formylmethylene)-3,3-dimethyl-5-methyl-2,3-dihydroindole | yellow |
| hexahydrocarbazole | 1-(2'-chloroethyl)-2-(formylmethylene)-3,3-dimethyl-5-methyl-2,3-dihydroindole | yellow |
| 1,2,3,4-tetrahydro-quinoxaline | 1-(2'-chloroethyl)-2-(formylmethylene)-3,3-dimethyl-5-methyl-2,3-dihydroindole | reddish-tinged yellow |
| 2-methyl-dihydroindole | 1-(2'-chloroethyl)-2-(formylmethylene)-3,3-dimethyl-5-cyclohexyl-2,3-dihydroindole | yellow |
| p-toluidine | 1-(2'-chloroethyl)-2-(formylmethylene)-3,3-dimethyl-5-cyclohexyl-2,3-dihydroindole | yellow |
| p-anisidine | 1-(2'-chloroethyl)-2-(formylmethylene)-3,3-dimethyl-5-cyclohexyl-2,3-dihydroindole | yellow |
| p-phenetidine | 1-(2'-chloroethyl)-2-(formylmethylene)-3,3-dimethyl-5-cyclohexyl-2,3-dihydroindole | yellow |
| p-phenetidine | 1-(2'-chloroethyl)-2-(formylmethylene)-3,3-dimethyl-5-trifluoromethyl-2,3-dihydroindole | yellow |
| p-toluidine | 1-(2'-chloroethyl)-2-(formylmethylene)-3,3-dimethyl-5-trifluoromethyl-2,3-dihydroindole | yellow |
| hexahydrocarbazole | 1-(2'-chloroethyl)-2-(formylmethylene)-3,3-dimethyl-5-trifluoromethyl-2,3-dihydroindole | yellow |
| 2-methyl-dihydroindole | 1-(2'-chloroethyl)-2-(formylmethylene)-3,3-dimethyl-5-trifluoromethyl-2,3-dihydroindole | yellow |
| p-anisidine | 1-(2'-chloroethyl)-2-(formylmethylene)-3,3-diethyl-2,3-dihydroindole | yellow |
| p-toluidine | 1-(2'-chloroethyl)-2-(formylmethylene)-3,3-diethyl-2,3-dihydroindole | yellow |
| 2-methyl-dihydroindole | 1-(2'-chloroethyl)-2-(formylmethylene)-3,3-diethyl-2,3-dihydroindole | yellow |
| 4-aminodiphenylmethane | 1-(2'-chloroethyl)-2-(formylmethylene)-3,3-diethyl-2,3-dihydroindole | yellow |
| hexahydrocarbazole | 1-(2'-chloroethyl)-2-(formylmethylene)-3,3-diethyl-2,3-dihydroindole | yellow |
| 1,2,3,4-tetrahydro-quinoxaline | 1-(2'-chloroethyl)-2-(formylmethylene)-3,3-diethyl-2,3-dihydroindole | reddish-tinged yellow |
| 6-methoxy-1,2,3,4-tetra-hydroquinoline | 1-(2'-chloroethyl)-2-(formylmethylene)-3,3-diethyl-2,3-dihydroindole | yellow |

I claim:
1. dyestuff of the formula

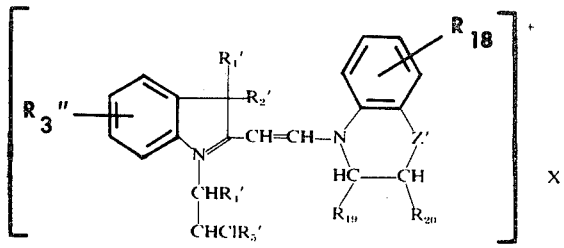

in which
R$_1$' is methyl, ethyl or n-propyl;
R$_2$' is methyl, ethyl or n-propyl;
R$_3$'' is hydrogen, methyl, ethyl, n-propyl, i-propyl, n-butyl, n-hexyl, n-dodecyl, fluorine, chlorine, trifluoromethyl, nitrile, carboxyl, methylmercapto, ethylmercapto, methylsulphonyl, acetamino, carbomethoxy, carboethoxy, sulphamoyl, cyclohexyl, phenyl, 4-nitro-phenyl, methoxy, ethoxy, n-propoxy, n-butoxy, phenoxy, phthalimidoethyl, 5,6-benzo, or 6,7-benzo; R$_4$' and R$_5$' independently of one another are hydrogen, methyl, ethyl, n-propyl, n-butyl, n-pentyl, n-hexyl, n-nonyl, carbophenoxy, methoxymethyl, ethoxymethyl, n-propoxymethyl, n-butoxymethyl, n-hexyloxymethyl, n-octyloxymethyl, n-nonyloxymethyl, n-decyloxymethyl, n-dodecyloxymethyl, phenoxymethyl, p-nitrophenoxymethyl, p-methoxyphenoxymethyl, p-chlorophenoxymethyl, phenyl, 4-methoxyphenyl, allyloxymethyl, chlorine or nitrile; or one of R$_4$' and R$_5$' is hydrogen and the other is chloromethyl;

X— is an anion;

R$_{18}$ is hydrogen or one or more identical or different radicals selected from the group consisting of chlorine, methyl, ethyl, n-propyl, iso-propyl, n-butyl, tert.-butyl, methoxy, ethoxy, n-propoxy, iso-propoxy, amino, acetamino, n-propionylamino, dimethylamino, diethylamino and di-(β-hydroxyethyl)-amino;

R$_{19}$ is hydrogen, methyl, ethyl, n-propyl, isopropyl, n-butyl, n-hexyl or cyclohexyl; and R$_{20}$ is hydrogen, methyl, ethyl, n-propyl, isopropyl, n-butyl, n-hexyl and cyclohexyl; or $R_{19}$ and $R_{20}$ conjointly form a 5-membered or 6-membered ring and represent a trimethylene or tetramethylene bridge or a trimethylene or tetramethylene bridge substituted by methyl, ethyl, n-propyl, methoxy or ethoxy; and $Z'$ is a single C—C bond, —O—, —S—, methylene, ethylidene, >NH, >N-CH$_3$, >N-C$_2$H$_5$, >N-n-C$_3$H$_7$ or >N-n-C$_4$-H$_9$.

2. Dyestuff of claim 1 in which $R_4'$ and $R_5'$ are both hydrogen.

3. Dyestuff of claim 1 in which one of $R_4'$ and $R_5'$ is hydrogen and the other is methyl, chloromethyl, phenyl, phenoxymethyl, methoxymethyl, allyloxymethyl, or n-hexoxymethyl.

4. Dyestuff of claim 1 in which one of $R_4'$ and $R_5'$ is hydrogen and the other is methyl.

5. A basic dyestuff of the formula

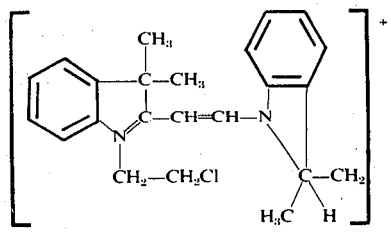

* * * * *